July 15, 1969     SHO ORII     3,455,526
VIBRATION-PROOF DEVICE FOR SHIFTING AND INSTALLING MACHINES
Filed Dec. 13, 1966     5 Sheets-Sheet 2
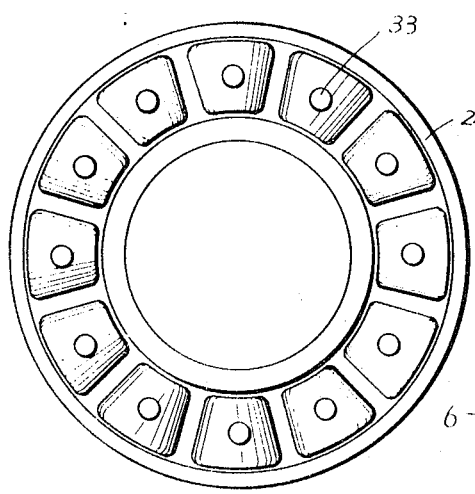
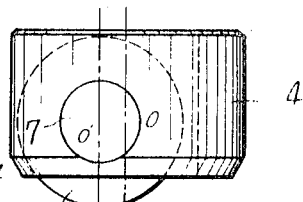
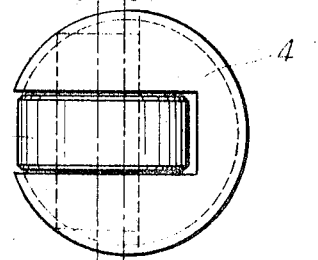
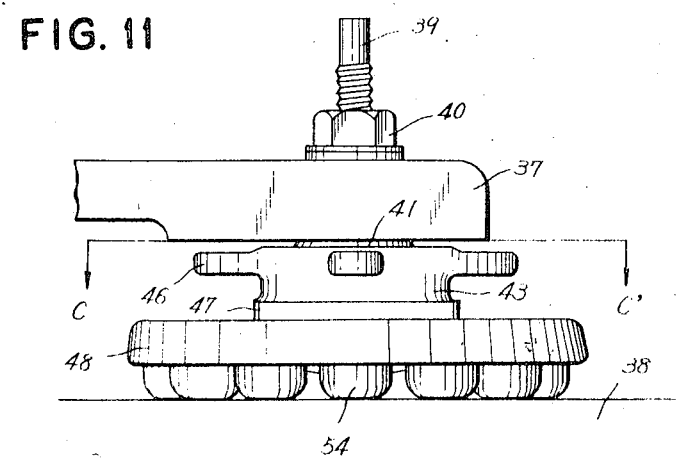

July 15, 1969 SHO ORII 3,455,526
VIBRATION-PROOF DEVICE FOR SHIFTING AND INSTALLING MACHINES
Filed Dec. 13, 1966 5 Sheets-Sheet 3

United States Patent Office 3,455,526
Patented July 15, 1969

3,455,526
VIBRATION-PROOF DEVICE FOR SHIFTING AND INSTALLING MACHINES
Sho Orii, 2102–1, Oaza Higashi-Hongo, Kawaguchi-shi, Saitama-ken, Japan
Filed Dec. 13, 1966, Ser. No. 601,357
Claims priority, application Japan, Dec. 21, 1965, 40/78,235; Mar. 2, 1966, 41/12,231; Aug. 8, 1966, 41/51,681
Int. Cl. F16m 3/00
U.S. Cl. 248—24                   15 Claims

ABSTRACT OF THE DISCLOSURE

A vibration damping device comprising a rotatable member mounted on a fitting which is secured to a support of a heavy article such as a machine, a vibration damper carrier being threadably mounted on the rotatable member for displacement between respective end positions in which vibration damping elements carried by the carrier or a rotatable roller supported in the rotatable member, is in contact with the floor.

---

The present invention relates to a vibration damping device which is mounted between the leg of a machine and the supporting floor so as to prevent transmission of the vibration from the machine to the floor.

Conventional devices of this type are usually fitted to the machine legs so as to prevent the machine vibration from being transmitted to the floor while also enabling adjustment of the horizontal level of the machine. However, since these devices themselves are not provided with any means enabling the displacement of the machine, it is necessary to use apparatus, such as a crane, for the moving of the machine from one location to another. Accordingly, although these known devices may provide vibration-damped installation of the machine, they cannot provide smooth displacement of the machine. Thus, these conventional devices are deficient in that they cannot permit ready change in the location of the machine after its installation.

It is an object of this invention to provide a vibration damping device enabling both displacement and installation of a machine, whereby the above-described deficiency is eliminated. According to the invention, a displacement means is provided on the vibration damping device itself so as to quickly and smoothly attain both displacement and installing operations of the machine.

More particularly, the present invention provides a vibration damping device which is fitted to three or four corners of a machine base, and which comprises means enabling displacement of the machine so arranged as to contact the supporting surface and roll in a desired direction in case the machine is to be displaced. When the machine is at the desired location a rotatable actuator member is rotated to move the displacement means to inoperative position and to move vibration damping elastic means into contact with the supporting surface whereby the machine is supported thereon in vibration damped relation. Furthermore, the device enables adjustment of the horizontal level of the machine by rotation of the rotatable member.

Other objects and advantages of the present invention will become apparent from the following description of several embodiments of the present invention as illustrated in the accompanying drawing, in which:

FIGURE 3 is a side elevational view of a displacement means used in the first embodiment of the present invention;

FIGURE 4 is a plan view of the displacement means shown in FIG. 3;

FIGURE 10 is a bottom view of a cover for vibration damping elastic bodies used in the second and third embodiments of the present invention;

FIGURE 11 is a side elevational view of the third embodiment of the present invention;

Figure 1:
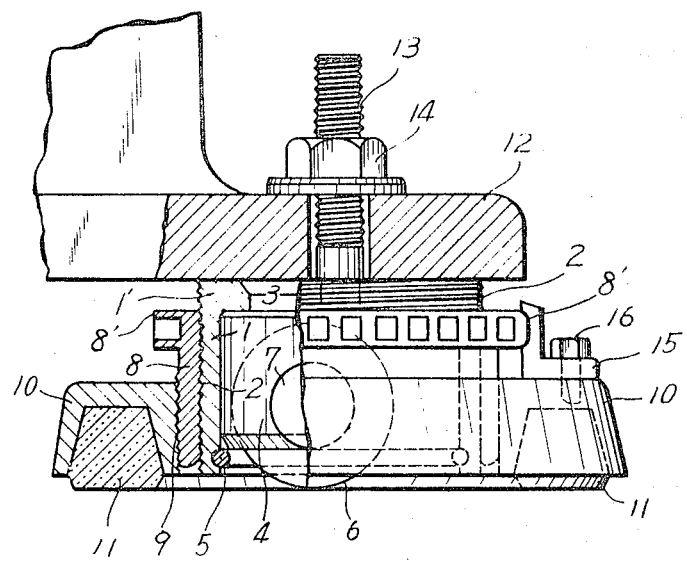
FIGURE 1 is a side elevational view, partly in section, of a first embodiment of the present invention fitted to the leg of a machine.
Figure 2:
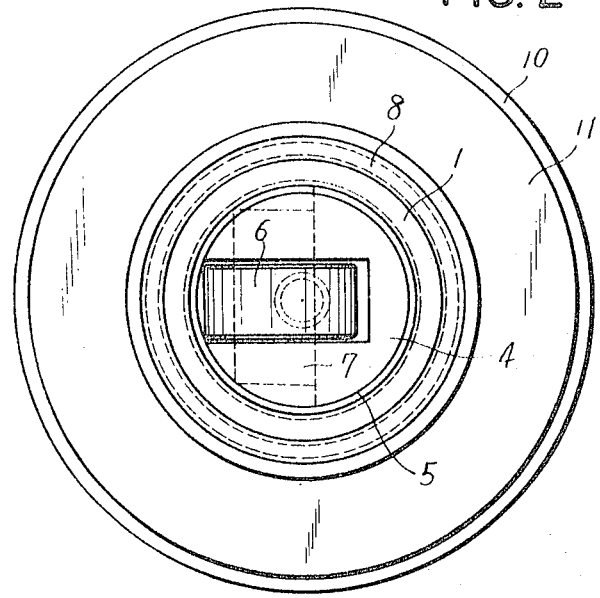
FIGURE 2 is a bottom view of the device shown in FIG. 1.

The first embodiment of the present invention will be described hereafter with reference to FIGS. 1–4 of the drawing.

There is shown a hollow fitting member 1 which is adapted for being attached to the leg of a machine as will be described later. The fitting member is of generally cylindrical shape and has a threaded outer surface 2. The fitting member has a closed upper end 1' with a hole 3 therein, and an open lower end. A frame 4 is rotatably mounted in the interior of fitting member 1, the frame 4 being retained in the fitting member by a metal ring 5 which is supported in a recess in the fitting member 1.

A cylindrical disc roller 6 is mounted by shaft 7 in the frame 4 for rotation about an axis O'—O' which is urged to an offset position from the central axis O—O of the frame. The roller 6 can be freely rolled in any direction by turning the frame 4. A thrust bearing (not shown) may be interposed between the upper face of the frame 4 and the upper end 1' of the fitting member to facilitate turning of the frame.

An actuator member 8 is threadably engaged on the outside of fitting member 1. The actuator member 8 has a slotted flange 8' by which the actuator member may be engaged and turned. The member 8 has an external thread 9 thereon with a pitch which is somewhat smaller than that of thread 2. A cover 10 is threadably engaged on the outer surface of member 8. The cover 10 has a trapezoidal shape in cross-section with an annular groove therein in which is accommodated an annular elastic vibration damping body 11 constituted of rubber or similar elastic material.

The fitting is attached to the leg 12 of a machine by a bolted arrangement in which a bolt 13 secured to fitting member 1 is engaged with a nut 14.

A rotation stop 15 is secured to cover 10 by bolt 16 and engages flange 8' to prevent relative rotation between member 8 and cover 10.

The roller 6, shaft 7 and frame 4 constitute a means enabling displacement of the machine leg on the floor.

In particular, when the roller 6 projects below the level of the body 11 it is in operative position and the weight of the machine rests on roller 6. In such configuration, the body 11 is in inoperative position. Thus, the machine may be moved along the floor on roller 6 to any position in which it is desired to fix the machine. When the machine reaches this position, the member 8 is rotated by engagement with flange 8' to cause the cover 10 to descend until elastic body 11 comes into contact with the floor surface, and the frame 4 and roller 6 is raised so that the roller 6 no longer contacts the floor surface. Thereby, the machine is supported via body 11 in vibration damped relation on the floor. The vertical position of the machine leg can be adjusted to regulate horizontally of the machine by turning the member 8 while the body 11 rests on the floor.

After the machine has been leveled in its desired location, the stop 15 is secured to cover 10 by bolt 16 to engage flange 8' and prevent loosening of the threaded engagement of the member 8 with fitting member 1 and cover 10 at threads 2 and 9 respectively.

Consequently, the device according to the invention permits displacement of the machine to a desired location, fixation of the machine at such location in vibration damped relation with the supporting surface and leveling of the machine while in fixed position at said location.

Figure 5:
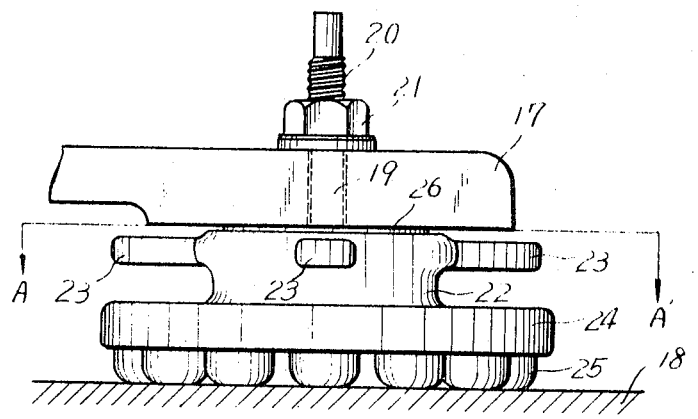
FIGURE 5 is a side elevational view of a second embodiment of the present invention.
Figure 6:
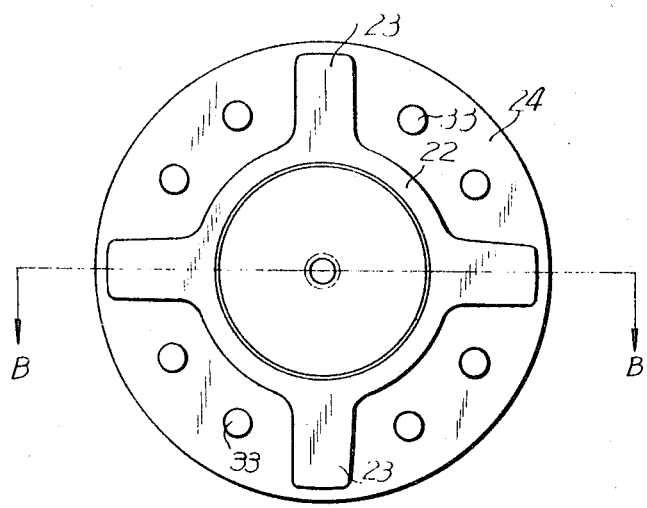
FIGURE 6 is a view as seen along the line A–A' of FIG. 5.

The second embodiment of the invention is illustrated in FIGS. 5–10. As shown in FIG. 5, the device is mounted between the leg 17 of a machine and floor surface 18. The device is secured to leg 17 by inserting an anchor bolt 20, which is mounted in a fitting 26 (FIG. 7) of the device, in a bolt hole 19 in leg 17 and securing the bolt with a nut 21.

A rotatable actuator member 22 having a handle 23 is mounted for rotation about fitting 26 via a stop ring 29. A rotatable annular plate 27 rests on member 22 and is rotatably coupled by spherical balls 28 with fitting 26 for a purpose to be shown later. A cover 24 carrying a plurality of vibration damping elastic bodies 25 is in threaded engagement with external threads 34 on the member 22. The elastic bodies are detachably secured in holes 33 in cover 24 and the number of bodies employed will be a function of the weight and frequency of vibration of the machine.

FIG. 5 illustrates an arrangement in which an elastic body 25 is provided in each of the holes 33 in the cover 24. However, if the machine is light in weight, four elastic bodies may be fitted at angular intervals of 90°, the other elastic bodies being omitted.

A roller bearing frame 30 is rotatably supported in the member 22 on a projection 35 thereof. A roller 31 is mounted, by a shaft 32, for rotation in frame 30. When the roller 31 is in contact with the floor 18, the machine can be shifted therealong. The bearing frame 30, roller 31 and roller shaft 32 constitute means enabling displacement of the machine on the floor. The center of the roller 31 and the roller shaft 32 is offset from the center line of the frame 30 and thereby from the center of the overall device so that it can roll in any desired direction.

The operation of the device described above will now be discussed.

Figure 7:
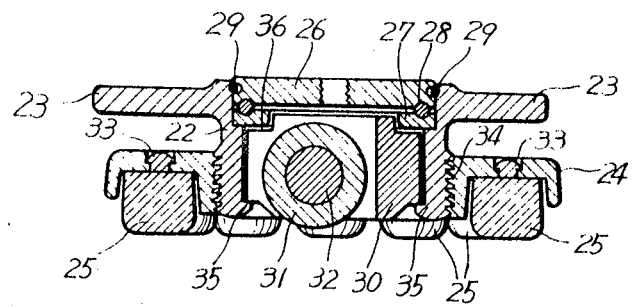
FIGURE 7 is a sectional view as taken along the line B–B' of FIG. 6.
Figure 8:
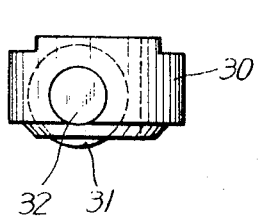
FIGURE 8 is a side elevational view of a displacement means used in the second embodiment of the present invention.
Figure 9:
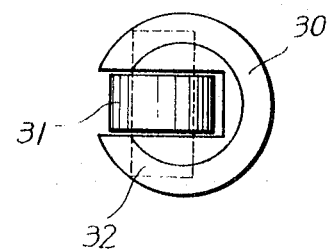
FIGURE 9 is a plan view of the displacement means shown in FIG. 8.

In FIGS. 5 and 7 there is illustrated the arrangement in which the roller 31 is spaced from the floor 18 and the vibration damping elastic bodies 25 are in contact with the floor 18. In this arrangement, the machine is in fixed position on the floor in vibration damped relation. If it is now desired to displace the machine, the member 22 is rotated by actuation of the handle 23. The rotation of the member 22 causes the rotating member 22, roller bearing frame 30, rotatable annular plate 27 and fitting member 26 to descend until the roller 31 comes into contact with the floor. In the state in which the roller 31 is not in contact with the floor, the weight of the machine is transferred to the floor 18 through the fitting member 26, balls 28, annular plate 27, member 22, threads 34, cover 24 and elastic bodies 25. The frame 30 is mounted with vertical play in member 22 so that a consequent space 36 is produced between the annular plate 27 and the roller bearing frame 30, as shown in FIG. 7. When the member 22 is rotated further and the cover 24 is held so as not to rotate with the rotating member 22, the weight of the machine is transferred to the floor 18 through the fitting member 26, balls 28, annular plate 27, roller bearing frame 30, roller shaft 32 and roller 31, whereby the rotation of the member 22 can now proceed with little resistance to raise the cover 24 and the elastic bodies 25 from the floor. When the bodies 25 are raised from the floor and a force is applied to the machine parallel to the floor, the machine can be displaced, by rolling of the roller 31, and thereby moved to a desired position.

After the machine has reached the desired position, the member 22 is rotated in the opposite direction, which causes the cover 24 to descend so that elastic bodies 25 contact the floor, and the roller 31 is raised therefrom. It is possible to adjust the level of the machine by rotating member 22 while the elastic bodies 25 remain in contact with the floor.

In the foregoing embodiment the balls 28 are interposed between the fitting member 26 and the annular plate 27 to lessen the resistance to rotation of the member 22. But, an arrangement is also possible in which the lower face of the fitting member 26 and the upper face of the annular plate 27 are in sliding contact, without the use of balls 28. It is also possible to omit plate 27, in which case the fitting member 26 and the roller bearing frame 30 are in sliding contact and the fitting member 26 and the member 22 are also in sliding contact. It is also possible to deform members 22, and 26 and 30 so that the sliding contact is not effected directly therebetween, but rather through balls interposed between these members.

Figure 12:
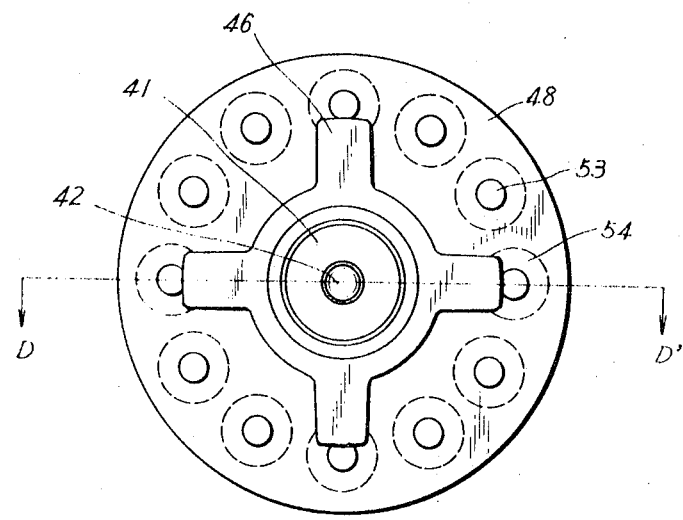
FIGURE 12 is a view as seen along the line C–C' of FIG. 11.
Figure 13:
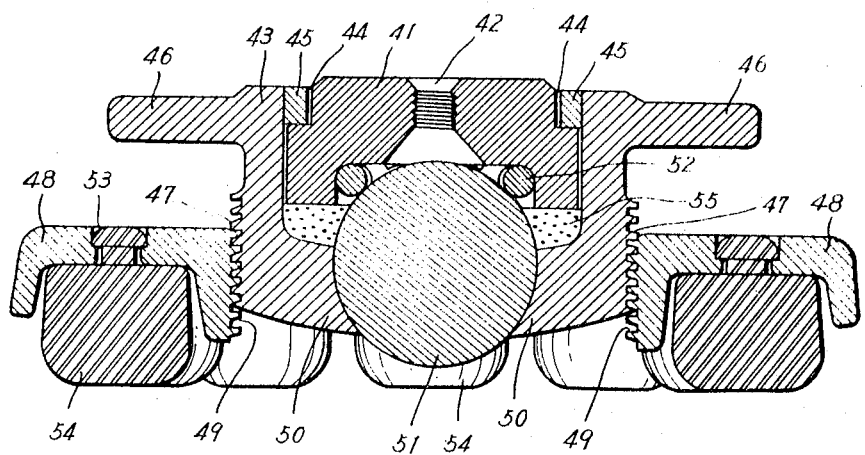
FIGURE 13 is an enlarged sectional view taken along the line D–D' of FIG. 12.

The third embodiment of the present invention is shown in FIGS. 11 to 13. As shown in FIG. 11, the device is interposed between the machine leg 37 and the floor surface 38 and is secured at the bottom face of the machine leg 37 by means of an anchor bolt 39 and an anchor nut 40. The interior structure of the device shown in FIG. 11 is shown in FIG. 13. As seen in this figure, a fitting member 41 has, in its center, a screw hole 42 into which the end of the anchor bolt 39 is screwed. Encircling the fitting member 41 is a rotatable member 43 which is passed thereover from below, and a stop ring 45 is press fitted into an upper notch 44 of the fitting member 41 thereby to secure the member 43 with the fitting member 41. The member 43 is provided with an actuating handle 46, and around the outer surface below the handle 46 is a thread 47 on which is screwed the threaded section 49 of a cover 48. On the lower inner peripheral face of the member 43 is a projecting portion 50 which rotatably supports a steel ball 51. Between said steel ball 51 and said fitting member 41 are mounted a plurality of small steel balls 52 to facilitate the rotation of steel ball 51. Vibration damping elastic bodies 54 are secured in the cover 48 through fitting holes 53. Numeral 55 indicates a dust-proof synthetic foam resin interposed between the fitting 41 and the member 43.

The operation of the third embodiment of the instant invention will next be discussed. In FIGS. 11 and 13 there is illustrated the arrangement in which the machine is supported on the floor in vibration damped relation. In this arrangement the steel ball 51 is spaced from the floor 38 while the elastic bodies 54 are in contact with the floor 38. When it is desired to displace the machine, the member 43 is rotated by operating the handle 46. The rotation of the rotatable member 43 causes the member 43, steel ball 51, small steel balls 52, fitting member 41 and stop ring 45 to move downward until the steel ball 51 comes into contact with the floor 38. Under the condition where the steel ball 51 is spaced from the floor 38, the weight of the machine is applied to the floor 38 through the fitting member 41, small steel balls 52, steel ball 51, projecting portion 50, threads 47, 49, cover 48 and vibration damping elastic bodies 54. If the rotatable member 43 is further rotated while holding the vibration-proof elastic body cover 48 so as not to rotate with the rotatable member 43, the rotation of the rotatable member 43 meets with little resistance, thus permitting the cover 48 and the elastic bodies 54 to move upwards away from the floor. When the rotation of the member 43 is stopped at a position in which the bodies 54 are raised from the floor and a force is applied to the machine parallel to the floor, the machine rolls on the steel ball 51 along the floor to a desired position. Then, if the member 43 is rotated in the opposite direction, the cover 48 descends, the elastic bodies 54 contact the floor, and the steel ball 51 is raised from the floor. It is possible to adjust the level of the machine by rotating the member 43 while the elastic bodies 54 are kept in contact with the floor.

Figure 14:
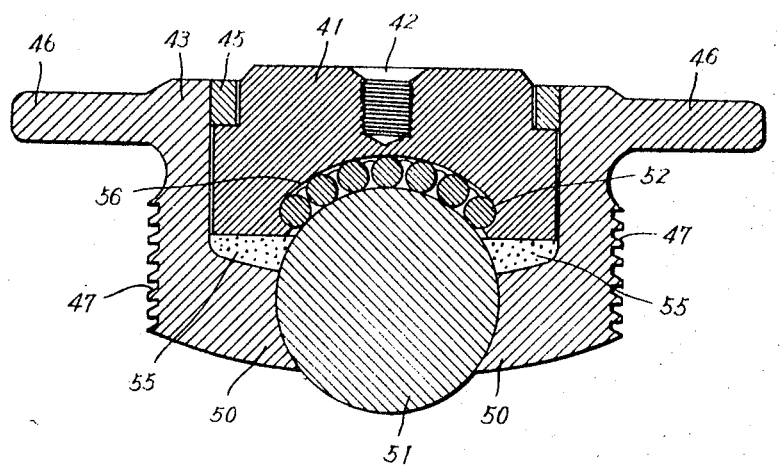
FIGURE 14 is a sectional view showing a modified form of the third embodiment of the present invention.

In the modified form of the third embodiment shown in FIG. 14, the bottom surface 56 of the fitting member 41 is of spherical form, and the small steel balls 52 are closely mounted between spherical surface 56 and the steel ball 51. The space formed between the spherical surface 56 and the surface of the steel ball 51 is somewhat narrower at the center than at the ends, so that the small steel balls 52 can move spirally on the surface of the steel ball 51 in accordance with the rotation of the steel ball 51, thereby reducing the resistance to rotation of the steel ball 51.

In the third embodiment, since a steel ball 51 is employed as the displacement means for the machine, the shifting operation in any desired direction can be effected smoothly from the stationary position. Furthermore, since the steel ball 51 is supported on projection portion 50, the number of component parts is restricted to a minimum and the structure is simplified, thus permitting the manufacture of the device easily and at low cost.

As explained above, it is possible with the present invention not only to dampen vibration and to effect horizontal adjustment of the machine, but also to permit displacement of the machine, so that both shifting and fixing operations of the machine can be achieved in a short time. Furthermore, since the vertical movements of both the means enabling displacement and the vibration damping elastic bodies are attained by the rotation of a rotatable actuator, the operation of the device is very easy.

In the foregoing description, several preferred embodiments of the present invention have been illustrated with reference to the accompanying drawings, but it is to be understood that the present invention is not limited to the above-described specific embodiments, and that many changes and modifications may be made within the scope and spirit of the invention if defined by the appended claims.

What is claimed is:

1. Vibration damping apparatus adapted for being attached to a support member to enable displacement of the support member on a supporting surface, fixing of the support member on the support surface and vertical adjustment of the support member relative to the supporting surface, said apparatus comprising first means adapted for being secured to a support member to receive the entire weight thereof, second and third means mounted for relative displacement and having respective operative positions for respectively enabling displacement of the support member on a supporting surface and for fixing of the support member on the supporting surface in vibration damped relation, and fourth means rotatably supported from said first means and coupled to said second and third means for adjusting the relative positions thereof for selectively and alternatively placing said second and third means in operative and inoperative positions, said second means comprising a rotatable member which is rollable on said supporting surface, said third mean comprising vibration damping means which in the operative position of said third means engages the supporting surface and resists relative displacement with respect thereto, said fourth means comprising an actuator element supported from the first means for rotation in opposite directions, said actuator element being threadably engaged with said vibration damping means and coupled with the rotatable member to cause movement of the damping means from operative to inoperative position and movement of the rotatable member from inoperative position to operative position when turned in one direction and reverse movements of the damping means and rotatable member when turned in the opposite direction, the threadable engagement of the actuator element and the vibration damping means enabling the actuator element to axially advance relative to the damping means when the latter is in engagement with the supporting surface, thereby providing vertical adjustment of the support member relative to the support surface, said actuator element being hollow and receiving said first means and a substantial portion of the rotatable member therein to limit the overall height of the apparatus.

2. A vibration damping device adapted for being attached to a support to enable selective displacement of the support on a supporting surface and fixation of the support on said supporting surface in vibration damped relation, said device comprising a fitting adapted for being secured to a support to receive the entire weight thereof, an actuator member mounted on the fitting for rotation and having a threaded outer surface and means on the outer surface to rotate the actuator member in opposite directions, vibration damping means threadably engaged on said actuator member for movement therealong between end positions, said vibration damping means in the region of one end position being in contact with the supporting surface, and roller means supported for rotation by said actuator member and having retracted and extended states relative to the vibration damping means, the roller means being retracted with the damping means in contact with the supporting surface, and being extended for contacting the supporting surface when the damping means is moved towards the other said end position and is out of contact with said supporting surface, said actuator member being hollow and receiving said fitting and a substantial portion of said roller means therein to limit the overall height of the device.

3. Apparatus as claimed in claim 1 wherein said first means projects above the actuator element to receive the entire weight of the support member thereon.

4. Apparatus as claimed in claim 1 wherein said rotatable member is a cylindrical disc, said second means further comprising means rotatable supporting said disc and in turn rotatable engaged in said first means, said actuator element being threadably engaged with the first means.

5. Apparatus as claimed in claim 1 wherein said rotatable member is mounted for rotation in the actuator element.

6. Apparatus as claimed in claim 5 wherein said rotatable member is a cylindrical disc, said second means further comprising a bearing rotatably supporting said disc, said bearing being mounted in the actuator element for displacement therewith and for relative rotation about an axis perpendicular to the axis of rotation of said rotatable member.

7. Apparatus as claimed in claim 5 wherein said rotatable member is spherical and is rotatably secured in the actuator element and projects therefrom.

8. Apparatus as claimed in claim 7 comprising spherical anti-friction members between the spherical rotatable member and said first means.

9. Apparatus as claimed in claim 8 wherein said first means has a surface facing the spherical rotatable member defining a space therewith in which are contained said anti-friction members.

10. Apparatus as claimed in claim 9 wherein said space has end portions and a central region, said space being slightly narrower in its central region as compared to its end portions so that the anti-friction members undergo a spiral movement on the surface of the spherical member upon rotation thereof.

11. A device as claimed in claim 2 wherein said fitting is of cylindrical form having an upper closed end and a lower open end, said fitting having a threaded outer surface, said actuator member having upper and lower open ends and having a threaded inner periphery which is threadably engaged with the outer surface of said fitting, the pitch of the threads on the inner periphery of said actuator member and the outer surface of said fitting being slightly larger than that of the threads between said member and said vibration damping means, said means comprising a roller bearing frame rotatably mounted within said fitting and a roller rotatably mounted in the frame about an axis which is offset from the center of the frame.

12. A device as claimed in claim 2 wherein said fitting is of disk-like shape and said roller means comprises a roller bearing frame rotatably mounted within said actuator member, and a roller mounted for rotation in said frame about an axis which is offset from the center of the frame.

13. A device as claimed in claim 2 wherein said roller means comprises a spherical element rotatably supported in said actuator member and spherical anti-friction elements interposed between the first said spherical element and said first means.

14. A device as claimed in claim 13 wherein said vibration damping means comprises a cover threadably secured to said rotatable member and a plurality of elastic bodies releasably fitted in said cover.

15. A device as claimed in claim 2 wherein said fitting projects above the actuator member to receive the entire weight of the support thereon.

References Cited

UNITED STATES PATENTS

| | | | |
|---|---|---|---|
| 664,798 | 12/1900 | Weidman | 16—32 |
| 901,636 | 10/1908 | McIntire. | |
| 957,303 | 5/1910 | Carter | 16—26 |
| 1,025,707 | 5/1912 | Meyer et al. | |
| 1,068,485 | 7/1913 | Davidson | 16—26 |
| 2,671,242 | 3/1954 | Lewis | 16—33 |
| 3,146,979 | 9/1964 | Keetch | 248—24 X |

FOREIGN PATENTS 313,049  7/1930  Great Britain.

ROY D. FRAZIER, Primary Examiner

ABRAHAM FRANKEL, Assistant Examiner

U.S. Cl. X.R.

16—26, 32